United States Patent
Abrams (10) Patent No.: US 7,386,886 B1
(45) Date of Patent: Jun. 10, 2008

(54) SYSTEM AND METHOD FOR PREVENTION OF BUFFER OVERFLOW INTRUSIONS

(75) Inventor: Roger Kenneth Abrams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1590 days.

(21) Appl. No.: 09/708,397

(22) Filed: Nov. 8, 2000

(51) Int. Cl.
*G08B 23/00* (2006.01)
(52) U.S. Cl. .......................... 726/23; 726/24; 709/232
(58) Field of Classification Search ................ 707/205; 710/57; 711/171, 152, 2; 713/201; 717/5, 717/136, 169, 175; 726/22–24; 709/232
See application file for complete search history.

(56) References Cited

U.S. PATENT DOCUMENTS

| | | | | |
|---|---|---|---|---|
| 5,949,973 A | * | 9/1999 | Yarom | 713/200 |
| 6,085,296 A | * | 7/2000 | Karkhanis et al. | 711/147 |
| 6,088,777 A | * | 7/2000 | Sorber | 711/171 |
| 6,397,379 B1 | * | 5/2002 | Yates et al. | 717/140 |
| 6,477,612 B1 | * | 11/2002 | Wang | 711/2 |
| 6,578,094 B1 | * | 6/2003 | Moudgill | 710/57 |
| 6,647,400 B1 | * | 11/2003 | Moran | 707/205 |

OTHER PUBLICATIONS

Microsoft Computer Dictionary, Fifth Edition, p. 378, "operating system"; and p. 388, "paging".*
Newton's Telecom Dictionary, 19th Edition, p. 577, "operating system".*
SearchWebServices.com Definition, "page, virtual memory, operating system, and RAM".*
Anup K. Ghosh et al., "Inoculating Software for Survivability," *Communications of the ACM*, Jul. 1999, vol. 42 No. 7, pp. 38-44.
Stephanie Forrest et al., "Building Diverse Computer Systems," *IEEE*, 1997, pp. 67-72.
Crispin Cowan et al., "Buffer Overflows: Attacks and Defenses for the Vulnerability of the Decade," *IEEE*, 1999, pp. 119-129.

* cited by examiner

*Primary Examiner*—T. B. Truong
(74) *Attorney, Agent, or Firm*—Winstead PC (57) ABSTRACT

Disclosed as a system and method for providing enhanced security to processes running on a data processing system. The disclosed system and method selectively revokes execute privileges from memory pages being used for stacks of susceptible processes running on the data processing system. By selectively resetting execute privileges on a per page and per process basis, the system and method maintains system performance and provides enhanced security to processes running on the data processing system.

8 Claims, 7 Drawing Sheets

SYSTEM AND METHOD FOR PREVENTION OF BUFFER OVERFLOW INTRUSIONS

TECHNICAL FIELD

The instant invention relates in general to a system and method for preventing buffer overflow infiltration in a stack-based data processing system operating environment. More specifically, the instant invention is a system and method for adding a user-accessible interface that will limit the execute on stack capability on a per-process basis.

BACKGROUND INFORMATION

The increase in connectivity between computers has led to a proliferation of interface data processing and computing devices in a large network, commonly referred to as the "Internet." The interconnection of the large number of resources has had many benefits, key among them the ability to share resources between a number of remotely-located processing machines.

Key among the disadvantages of such wide-area networked schema, however, are the security issues raised by the increased access of computing devices to the entire membership of the Internet. As the Internet grows, access for the membership of the Internet becomes increasingly synonymous with access for the public at large.

In answer to this reality, many popular security measures have been instituted on data processing machines throughout the Internet. These security measures range from the very simple (e.g., requiring a user name and password as a precondition for access to a machine) to the complex (e.g., construction of sophisticated firewalls which limit access to certain machines from certain addresses and through certain ports). As the number of different security systems has increased, so have the opportunities for rogue users to attempt to access remote systems improperly. These attempts, commonly called "hacking," give rise to the need to design more sophisticated security systems to meet and defeat these attacks.

One of the most common methods for compromising the security of a data processing machine in a networked environment is called a buffer overflow attack.

Buffer overflow attacks may be perpetrated against a remote machine which accepts user commands and data remotely, called the "server". The server receives the commands and data from a user's machine, called a "client". Upon receipt, the server may store the commands and/or data received from the client in a temporary memory location, called the buffer. In most server operating and memory management systems, the buffers made available for storing commands and data received from a client are within a data structure called the "stack".

The stack is a contiguous block of logical memory space which is made available to an application or process for the storage of data. The data stored by an application or process within the stack may comprise local variable, definitions and values, the definitions and values of parameters passed to the application or process, a return address or instructions, as well as temporary buffers.

Attacking users, called "hackers", may attempt to use the fact that all these data items are stored within a contiguous memory structure to their advantage in infiltrating the security measures of an application or process. A hacker wishing to infiltrate such a system may send a block of data from a client to the server where the data is longer than the application or process is expecting. The server for the application or process stores the data within the buffer on the stack. However, the server places the data in a buffer sized to receive a normal data block. The result is that the data is written past the end of the buffer. On a server machine having a stack architecture, this overflow results in the portion of the stack holding the application or process' other data, being overwritten. Notably, the return address for the application or process may be some of the very data that is overwritten. A clever hacker can design such a buffer overflow so that a processee's return address is overwritten with a reference to programming code placed in the buffer or an overwritten portion of the stack.

In such a case, when the process owning the stack ceases execution and attempts to return to a calling application or process, the return address it executes causes an infiltrator's code to execute instead. The infiltrating code may create new user IDs with superuser authority, delete files, copy files, or provide other security breaches to the benefit of the hacker.

Once the system is compromised in this manner, a hacker may fully compromise the system, removing suspicious entries from logging files and modifying programs to introduce very sophisticated subversive access routes (called "back doors"), resulting in a fully compromised system.

What is needed is a system and method for improved security on data processing archives to prevent these types of buffer overflow attacks. Such a system and method must provide the flexibility of access to authorized users of the server machine while denying hackers the ability to place inappropriate return addresses and executable code on the process stack. What is also needed is a system and method which performs these tasks so that undue overhead and expense in processor time and memory. Several authors in the art have suggested placing a checking variable adjacent to the return address within the stack in order to thwart these attacks. The checking variable, called a "canary," can be checked prior to any return address call in order to ensure that the stack has not been overwritten. If the stack has been overwritten, the value of the canary will be changed and execution of the application may be aborted before an inappropriate return call is made.

The deficiency in the canary approach is that it adds excessive instructions to verify the canary upon each return address call. Accordingly, what is needed is a mechanism to prevent buffer overflow attacks which does not cause such an increase in processing time.

SUMMARY OF THE INVENTION

The present invention addresses the foregoing needs by providing a system and method for protecting stacks against buffer overflow attacks. The invention takes advantage of Application Programming Interfaces ("APIs") of modern applications to create a new form of adaptation to prevent the execution of rogue programming code introduced during a buffer overflow attack.

The invention comprises the addition of a user-space accessible API to the memory management reuters that can change the "execute-on-stack" capability of the memory model on a per-process basis. Accordingly, a process that begins which is known to be subject to these kinds of buffer overflow attacks can call the API indicating to the underlying operating system and memory manager that the application is disallowing any execute-on-stack capability for itself. The memory manager or operating system records this fact in the process structure. The operating system and/or memory manager can mark the process stack structure accordingly.

When the memory manager or the operating system receives a page fault and attempts to allocate a new page of memory, it looks to the process structure for the current process to determine if execute on stack capability is TRUE or FALSE. If the process has not called the API to disable execute on stack, then the execute on stack capability will be TRUE, and execution and memory allocation proceeds in a normal fashion. No additional overhead is used.

If, on the other hand, the process has called the API causing the execute-on-stack flag to be set to FALSE, the memory manager will execute a routine in accordance with the present invention to determine whether the page to be allocated is a stack page. If the page is to be a stack, the memory manager resets the bit in the pagetable that permits execute privileges for that page. If a hacker attacks with a buffer overflow attack and the process executes its return instruction, attempts to execute code from the corrupted stack area will immediately be prohibited by the hardware. The hardware will trigger an interrupt that causes the process to be killed without executing any of the hacker's code.

The foregoing outlines broadly the features and technical advantages of the present invention in order that the detailed description of the invention that follows may be better understood. Additional features, advantages, and a preferred embodiment of the invention will be described hereinafter, which form the subject of the claims of the invention.

BRIEF DESCRIPTION OF THE DRAWINGS

For a more complete understanding of the present invention, and the advantages thereof, reference is now made to the following descriptions, taken in conjunction with the accompanying drawings, in which.

DETAILED DESCRIPTION OF THE INVENTION

In the following description, numerous specific details are set forth such as computer applications, operating systems, programming languages, data structures, microprocessors, network systems, communications systems, bus systems, protocols, input/output (I/O) systems, etc., to provide a thorough understanding of the invention. However, it will be obvious to those skilled in the art that the present invention may be practiced without such specific details. In other instances, well-known applications, operating systems, network systems, protocols, data structures, equipment, and I/O systems have been shown in block diagram form in order to not obscure the present invention in unnecessary detail. For the most part, details concerning timing considerations, specific applications used, specific languages used, specific operating systems used, specific data formats used, and the like have been omitted inasmuch as these details are not necessary to obtain a complete understanding of the present invention and are well within the skills of persons of ordinary skill in the art.

It should be understood that, in the context of this disclosure, a "server" or a "server machine" or the like is a reference to a data processing system which executes a server program. A server program is one which responds to requests from a client machine received from a network connection. In fact, the data processing system that acts as a server may also run other programs, including programs which interact with the server program within the instant invented system. Likewise, a "client" is a data processing system which runs a client program and may run other programs, including a server program. Accordingly, it is possible, although those skilled in the art will appreciate it may not be practical in many instances, for a single data processing system to act as server and client simultaneously.

Those skilled in the art will also appreciate that, throughout this specification, the terms "data processing system", "machine" and "computer" are used interchangeably, each having the meaning of a data processing system in its broadest sense.

Hardware Environment

Figure 1:
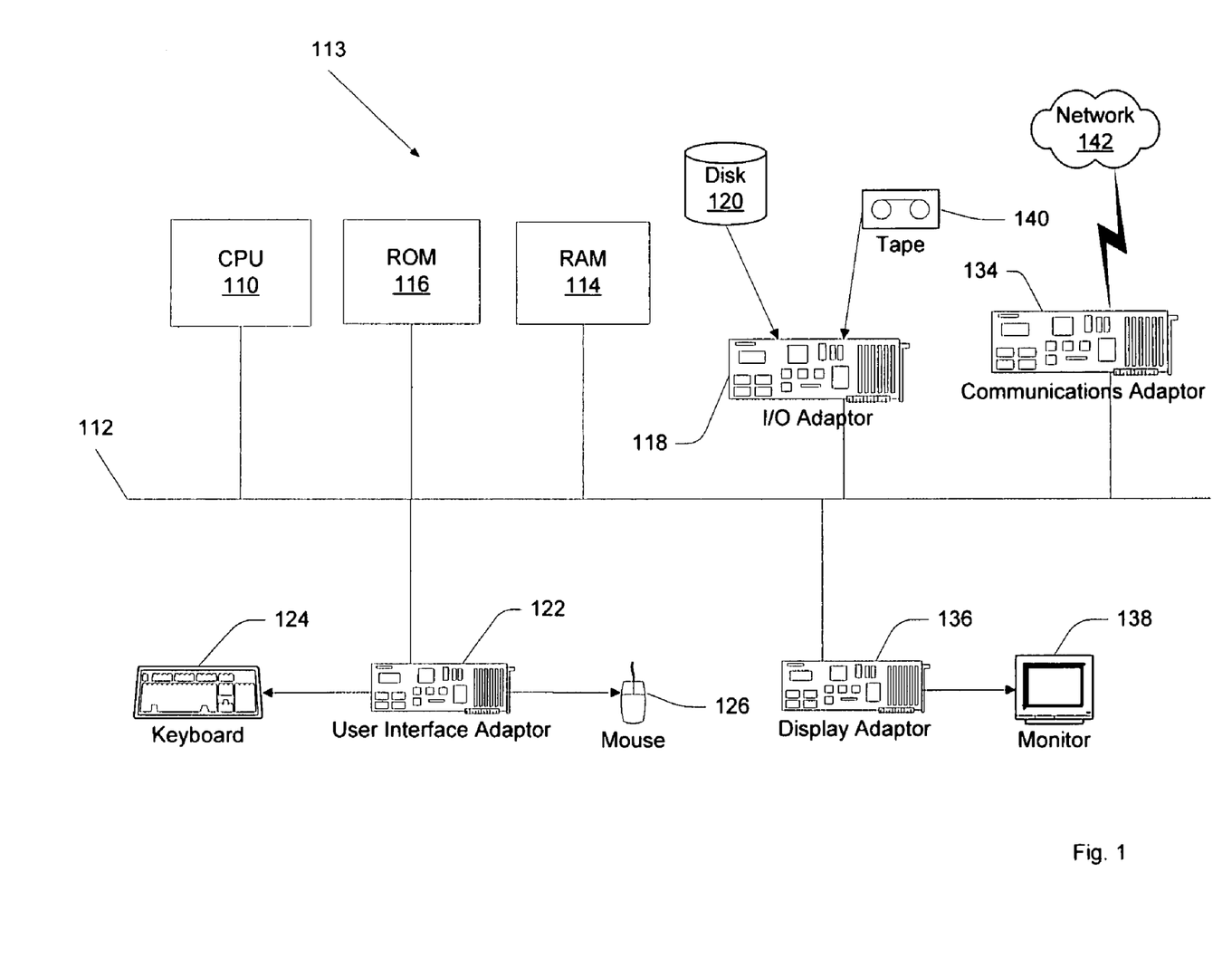
FIG. 1 is a block diagram of a data processing system in accordance with the present invention.

A hardware environment for practicing the present invention and its components as depicted with reference to FIG. 1 which illustrates a hardware configuration of a data processing system 113 in accordance with the subject invention. The data processing system 113 includes a central processing unit ("CPU") 110, such as a conventional microprocessor, and a number of other units interconnected via a system bus 112. The data processing system 113 includes a random access memory ("RAM") 214 and a read-only memory ("ROM") 116. Also included are an I/O adapter 118 for connecting peripheral devices, such as disks units 120 and tape drives 140 to the bus 112; a user interface adapter 122 for connecting a keyboard 124, a mouse 126 and/or other user interface devices such as a touch-screen device (not shown) to the bus 112; a communications adapter 134 for connecting the data processing system 113 to a data processing network 142; and a display adapter 136 for connecting the bus 112 to a display device 138. CPU 110 may include other circuitry not shown herein, which will include circuitry found within a microprocessor, e.g., execution unit, bus interface unit, arithmetic logic unit ("ALU"), etc. The CPU 110 may also reside on a single integrated circuit ("IC").

Those skilled in the art will appreciate that the representative hardware environment depicted in FIG. 1 may be suitable not only to execute the server processes and methods described in this disclosure, but also to execute networked functions such as routing and communication serving and the like, which may be necessary for the proper and efficient operation of the underlying network environments. It should also be noted that these routing and communication serving operations may be performed in accordance with the instant invention to provide enhanced security to the network system.

Memory Mapping

Figure 2:
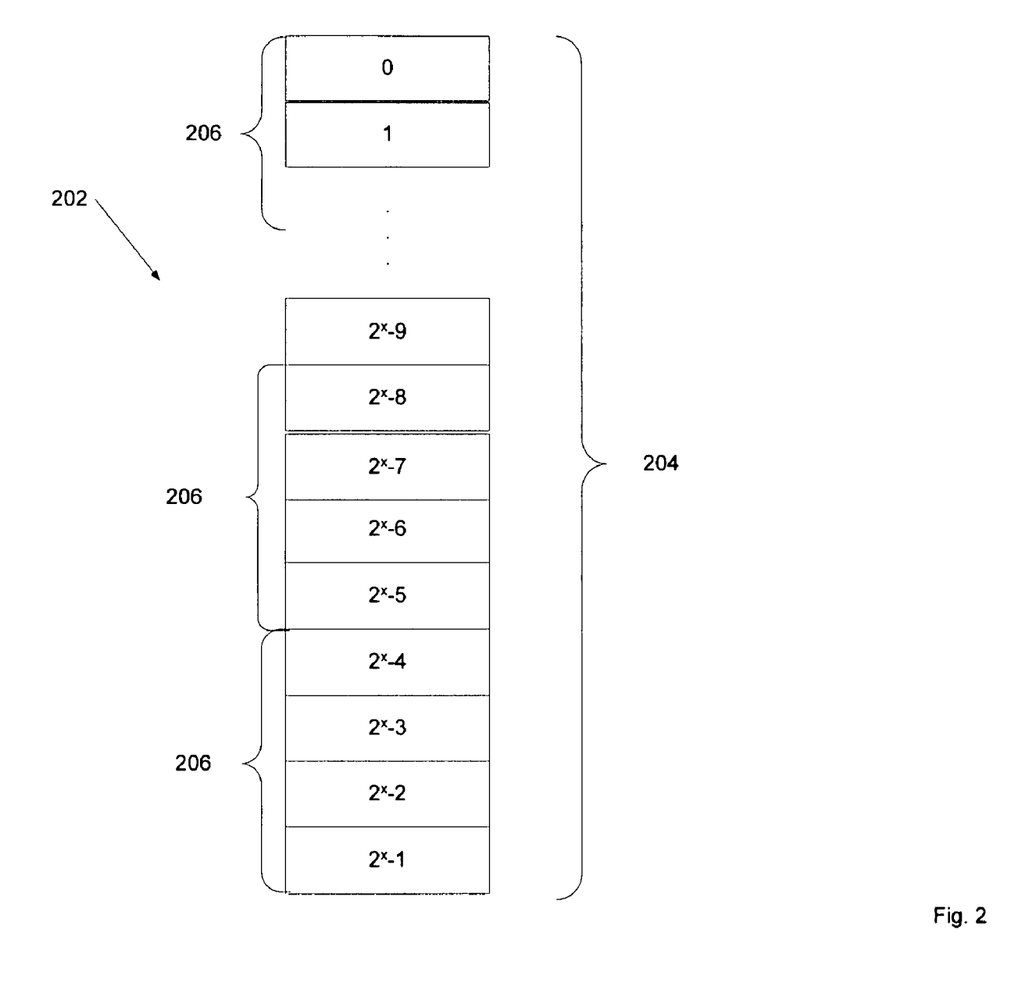
FIG. 2 is a diagram of a memory configuration used in a data processing system.

The RAM 114 included within a data processing system 113 is organized as an ordered set of registers as depicted in FIG. 2. The registers 204 of the RAM 202 are numbered 0 through $2^X$ minus 1, where X is the address length of the RAM 202 addressing system. While the RAM 202 is, at least logically, a contiguous string of registers, it is often convenient, as those skilled in the art will appreciate, to view this one-dimensional array of memory elements as if it were partitioned into smaller sub-memories, called "pages" 206. Those familiar with the art will recognize that, depending upon the specific hardware and operating systems involved, pages 206 may also be called "banks", "blocks", or "segments". The pages 206 into which the physical RAM 202 is divided are logical partitions and may or may not have a direct relationship to the physical structure of the RAM 202 within the data processing system.

It will also be appreciated that the size of the logical partitions 206 may vary, depending upon the specific data processing system involved. However, due to addressing considerations within the binary environment, the partition 206 size is generally equal to a perfect power of two number of registers 204.

It is common within the art to view RAM 202 as partitioned into pages 206 in order to allocate different pages 206 of memory for different purposes. For example, each computer program or process executing on a data processing system may be assigned one or more separate pages 206 of RAM 202. Each of the pages 206 of memory may be allocated to hold various and different data patterns. One page 206 may be allocated to store the process code which the CPU will execute. Another register may contain an execution stack for use by a process. Other registers may be allocated to data. Other pages may be used solely as caches or buffers.

The allocation and use of the pages 206 of memory within the RAM 202 may be managed by a computer program. Such management functions may be incorporated into the operating system of the data processing system, may be a function of an add-on to an operating system, or may be managed in a stand-alone program, such as a terminate-and-stay resident ("TSR") memory management program. Such memory management program does not only control which pages 206 of memory are addressed under various conditions. It may perform additional functions. For example, the memory manager may have the ability to indicate when a non-existent memory area is addressed, such as in the case where a portion of the RAM is not physically populated with memory chips. Also, the memory manager may have the ability to flag whether data within a certain memory page is executable by the CPU. Similarly, the memory manager may track the different types of data stored within the page.

The memory manager may also provide additional critical functions, such as the allocation and reclamation of memory pages. When a memory page gets full, a page fault is triggered and the memory manager is called to allocate an additional page of memory. Similarly, when a page of memory is no longer needed by an application or to store data, that page may be returned to the memory manager for reallocation at a later time.

The use of the memory manager and memory pages as a means to allocate and deallocate memory space provides flexibility of the memory space. However, the overhead created by the memory manager, particularly when it performs special functions, such as checking for memory page executability, can cause increase load on the CPU and draining critical system resources.

Anatomy of a Buffer Overflow Attack

Figure 3:
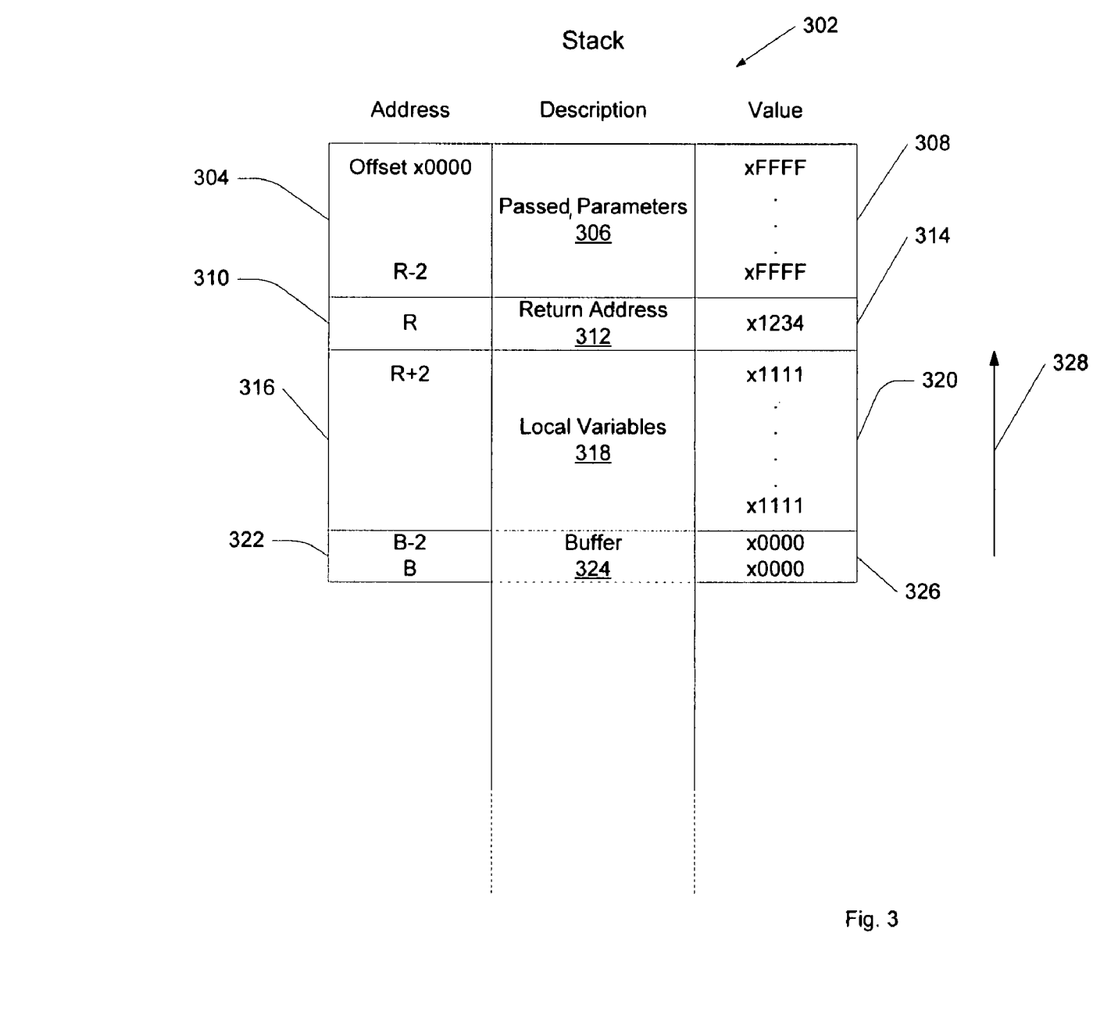
FIG. 3 is a block diagram of a stack structure demonstrating an uncorrupted state.

A buffer overflow attack is described in detail with reference to FIG. 3. FIG. 3 depicts a page of memory dedicated to an execution stack 302 for a procedure 302. Each memory location within the stack 302 has associated with it an address 304, 310, 316, 322. Locations within the stack 302 may be referenced by calling or referring to an offset address 304, 310, 316, 322 which is relative to the bottom of the stack 102. Accordingly, the bottom of the stack 304 begins at offset address 0000.

Each memory location also has associated with it a value 308, 314, 320, 326. While descriptions 306, 312, 318, 324 are also shown on FIG. 3, those skilled in the art will appreciate that the descriptions shown are for annotations only and do not actually appear within the memory model. The descriptions for illustration annotate the stack 302 as it is used by a processes running on a network server system. Other stack configurations may be used, all falling within the present invention. The bottom of the stack, beginning with offset 0000 304 is used to store parameters passed 306 to the process from other applications. As depicted on FIG. 3, those values 308 may be FFFF, but those skilled in the art will readily appreciate that passed parameters 306 may have meanings beyond such generic hexadecimal values.

Next on the stack, at an address, represented by the value R 310 is the return address 312. This return address 312 represents the address in memory where the CPU will return execution once the process controlling the stack terminates execution. For example, the value of the return address 312 may be the value 314 1234.

Next on the stack 302, beginning at address 316 R+2 are the local variables 318. While the local variables 318 will have values 320 which are used by the application locally, for purposes of the illustration in FIG. 3 those values are each set to 1111.

Also present on the stack 302 at an address 322 denoted by B is the buffer 324. The buffer shown in FIG. 3 occupies two address locations and is filled with the values 326 0000, for illustration.

The buffer 324 is used to store temporary data, such as transmission data passing through a server process. Such data is written into the buffer in the direction indicated by the arrow 328.

Figure 4:
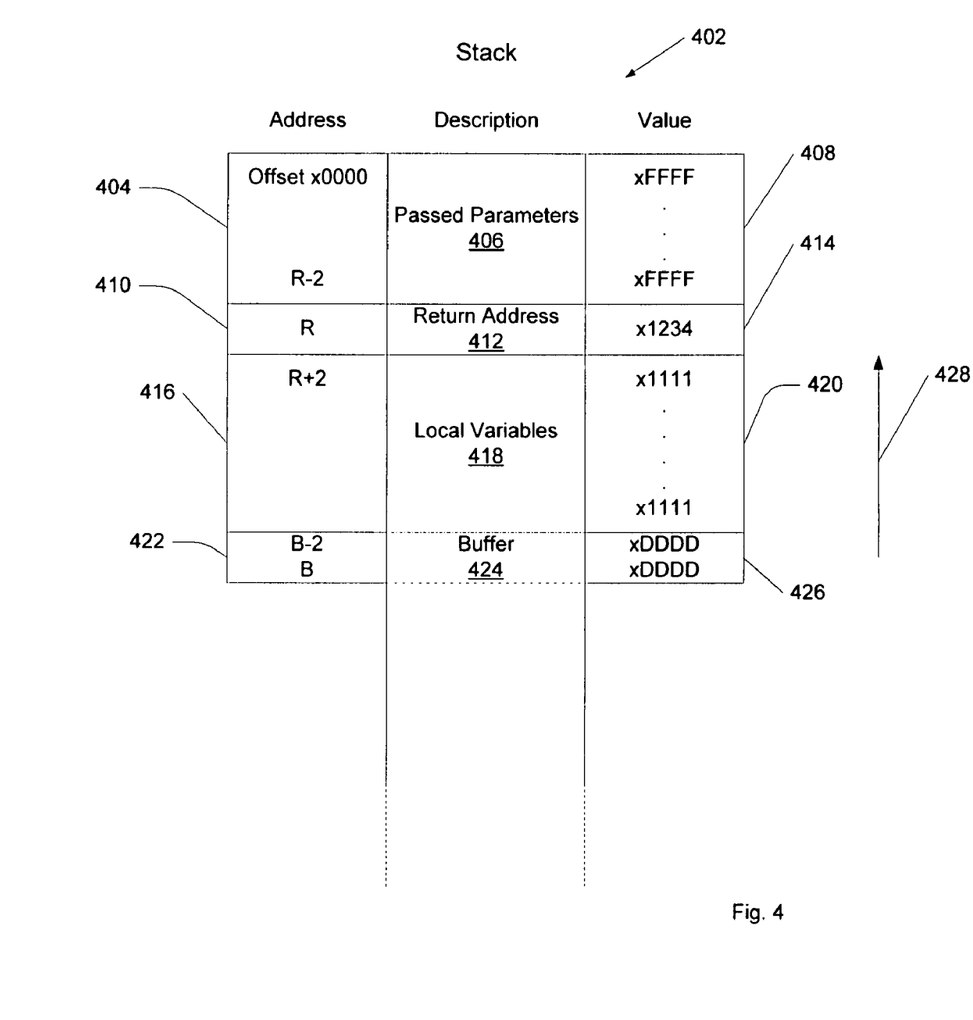
FIG. 4 is a block diagram of a stack structure demonstrating data (XDDDD) stored within the buffer of the stack.

FIG. 4 demonstrates a stack 402 where the buffer 424 has been filled with data 426 represented by DDDD for the purposes of illustration. When data, the size of which is the size of the buffer 424 or less, is entered into the stack 402, there is no problem and no intrusion takes place. The process functions normally and returns control to its calling program normally.

Figure 5:
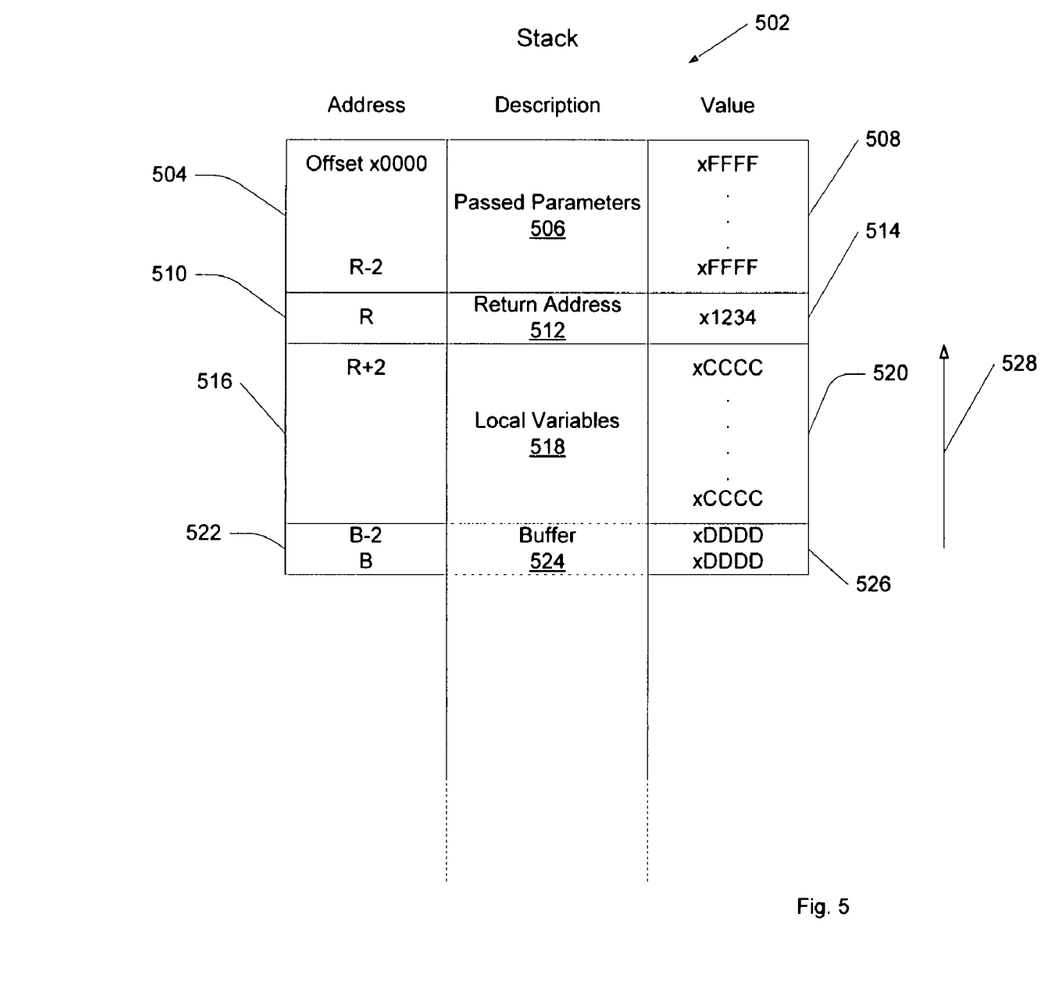
FIG. 5 is a block diagram of a stack structure showing data (XDDDD) and hacker code (XCCCC) stored within the stack.

An example of buffer overflow is demonstrated with reference to FIG. 5. FIG. 5 demonstrates a stack 502 having a buffer 504 at addresses B through B-2 522. However, in this instance, the size of the data value in 526 has exceeded the size of the buffer 524 such that the balance of the data has infringed on the local variables 518 in the address space 516; they have been overwritten with new values 520. For purposes of illustration, the values in FIG. 5 are CCCC. Thus, a user, by submitting to the process data 526 of a size larger than that allocated to the buffer 524 has overwritten the data values 520 for the local variables 518 within the stack 502.

Figure 6:
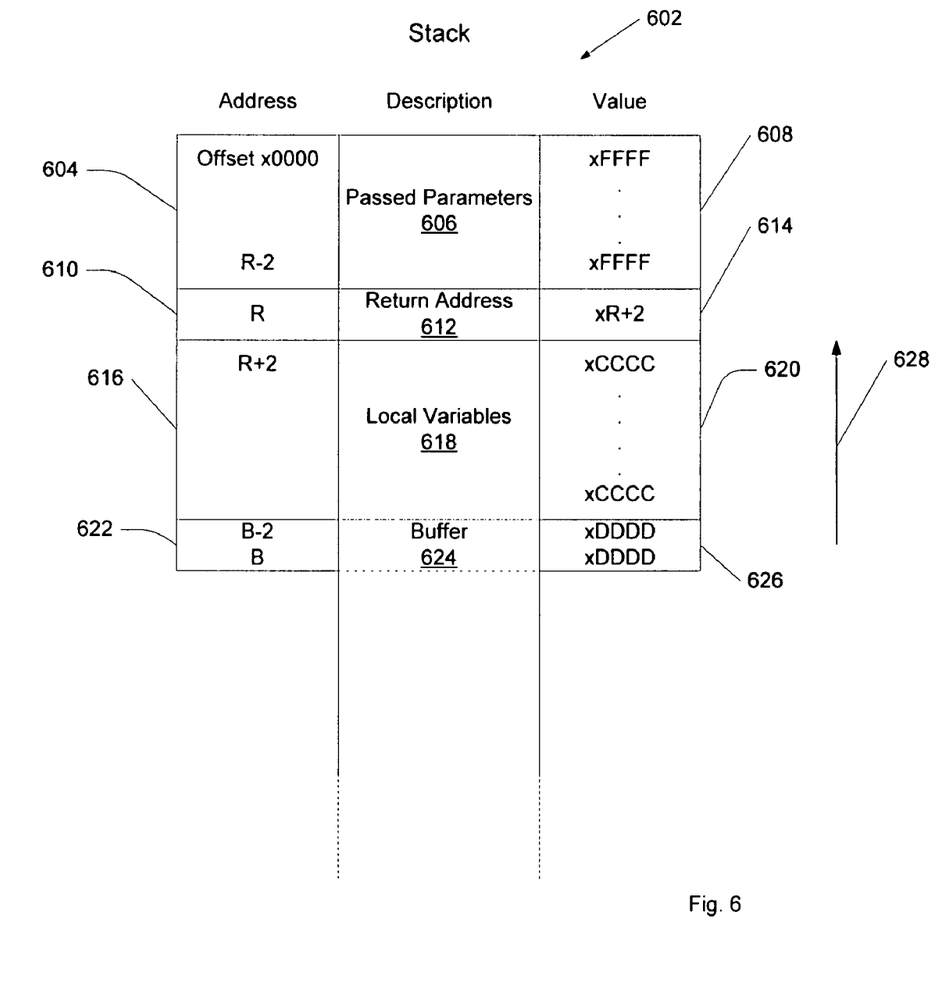
FIG. 6 is a block diagram of a stack structure demonstrating complete infiltration of the structure by a buffer overflow attack.

An accomplished buffer overflow intrusion is demonstrated with reference to FIG. 6. FIG. 6 depicts a stack 602 having a buffer 624 filled with data values 626. The data values 626 have exceeded the limits of the buffer 624 and have overwritten the local variable 618 value space at 620.

Additionally, the user has introduced an additional element of data which is stored in the next memory location as indicated by the arrow 628. That memory address is at address R 610, where the return address 612 is normally stored. Accordingly, rather than 1234 being stored as the value in location 614, the value 614 has been overwritten with the address R+2.

A stack buffer overflow intrusion is accomplished by replacing the return address 612 with the address of a location within the local variables 618. If a user fills the local variable 618 memory space with data value 620 which represents the executable code (xCCCC), when execution of the application finishes, the return address 612 is referenced at address offset R 610. The CPU introduces the value 614 into the CPU pointer register, causing execution to begin at address R+2 616. Address R+2 616 corresponds to the local variable portion of the stack 602 which was overwritten with the code data (xCCCC) 620. Accordingly, the code data 620 executes.

Through this series of steps, an intruder is able to insert his own code 620 and execute the code from within the stack 602.

This kind of buffer overflow attack is completely dependent on the ability to execute machine instructions that reside in the memory belonging to the stack. While the memory management hardware makes it possible to disallow this execution, several major operating systems and memory management softwares do not utilize this feature. For example, Linux, Solaris, and Windows NT are three popular operating systems (which incorporate memory managers) which do not take advantage of this feature. One reason why these programs do not take advantage of the ability to prohibit execution of programs on the stack is that there are limited circumstances where certain programs might want to dynamically build a small block of code on the stack and execute it. Additionally, there are some performance issues indicated when the memory management software or hardware must examine every page fault (which triggers allocation of another memory page) to determine if the memory page to be allocated is a stack page.

The instant invention adds a user-space accessible API to the memory management model. The API can change the execute-on-stack capability on a per process basis. Accordingly, when a process running on the server is of a type that is subject to these kinds of buffer overflow attacks (such as the FTP daemon) the process can call the API with the parameter indicating to the underlying operating system or memory manager that the process is choosing to disallow all execute-on-stack capability for its memory space. The operating system or memory manager marks flags in the process structure accordingly.

When the memory manager receives a page fault and attempts to allocate a new page to an application, it examines the process structure for the current process. If the execute on stack capability is TRUE (the default), it proceeds in a normal fashion without modification. No additional overhead is used. If, on the other hand, the memory manager examines the process structure and determines that execute-on-stack capability is FALSE, the memory manager performs the extra processes necessary to determine whether the page being allocated is to be allocated as a stack page. If the page is to be a stack page, the memory manager removes the bit in the page table that permits execute privileges for that page.

When an infiltrator attacks with a buffer overflow and the process owning the stack executes it return instruction, the fact that execute privileges for the page have been denied causes a hardware interrupt which results in the process being killed without executing any of the infiltrator's code. With many perpetually-running services, the init process can then rerun the application so that subsequent users are not impeded by the results of the potential attack. Those skilled in the art will recognize that the init process is unique to the Unix environment, however similar processes exist or can be mimicked in other systems so that the present invention may be applied to a wide-variety of operating systems.

Figure 7:
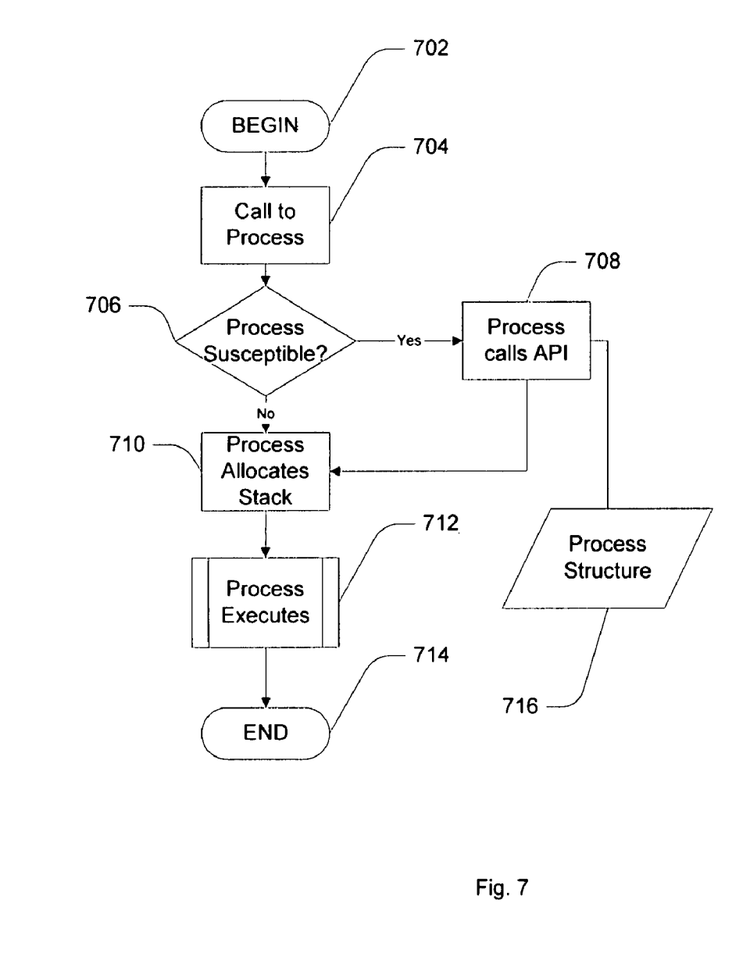
FIG. 7 is a flowchart in accordance with ANSI/ISO Standard 5807-1985 depicting the operation of the invention when a procedure call is initiated.

The methodology of the instant invention is demonstrated with reference to FIG. 7. The method begins 702 with the precondition of a calling application and an API in conformity with the current invention.

The method begins with a call 704 to a subject process from a parent application. Immediately upon call, a determination is made as to whether the process called is susceptible 706 to buffer overflow attacks. If that determination is in the negative, then the process allocates the stack 710. If, however, the process is found to be susceptible, the process calls the API of the subject invention 708. The API makes reference to the process structure 716 and sets flags within the process structure to indicate that execute on stack privileges for memory pages allocated for the stack of the instant process should be limited. Execution then continues with the process allocating a stack 710.

Under either event, the subject process executes 712. The process method ends 714 without particular post-condition.

Figure 8:
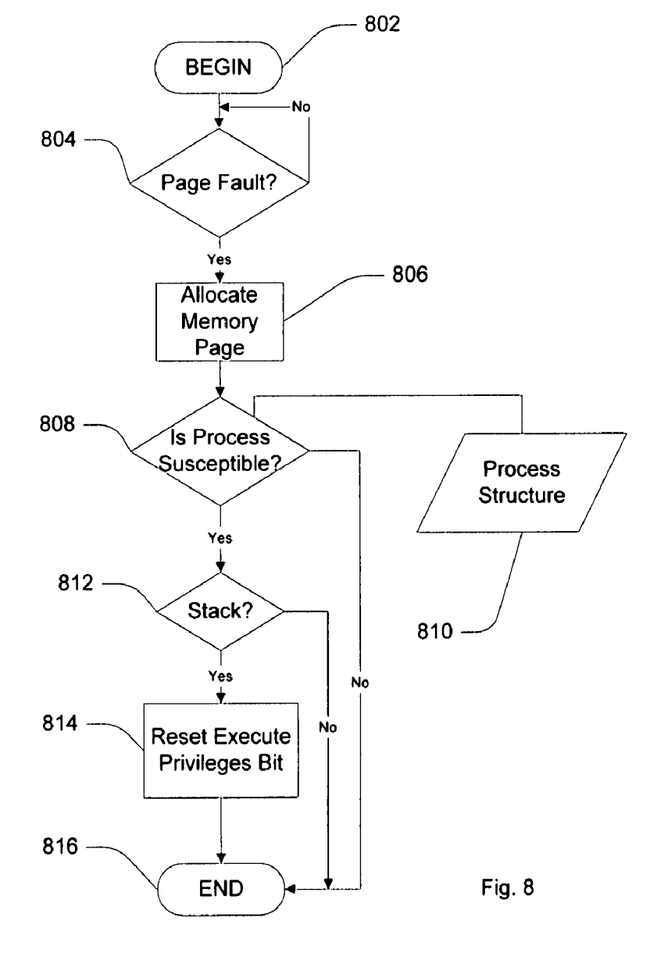
FIG. 8 is a flowchart in accordance with ANSI/ISO Standard 5807-1985 depicting the operation of the invention when a page fault is triggered.

The methodology followed under the instant invention to allocate additional memory pages is depicted with reference to FIG. 8. In most cases, the process depicted in FIG. 8 will occur during the execution of the underlying process (712 in FIG. 7). Accordingly, the methodology for allocating memory begins 802 with the precondition of a process executing which has been evaluated according to the methodology described in FIG. 7. The methodology waits 804 for a page fault. Upon page fault 804, the instant invention allocates a memory page 806 for use by the subject process. A determination is then made as to whether the process is susceptible 808 to buffer overflow attacks. This determination is made with reference to the process structure 810 which is the same process structure previously written (FIG. 7 at 716). If the process is not susceptible, execution proceeds to the end and the memory allocation process is finished.

If, however, the subject process is susceptible to buffer overflow attacks, the memory management methodology proceeds to determine 812 whether the memory page allocated will be used for a stack by the subject process. If the subject process is not using the allocated memory as a stack, execution terminates 816.

If, however, the page to be allocated is to be used for stack space by the subject a process, the memory management methodology resets the execute privileges bit on the page table for the page 814. Execution then terminates 816. Upon termination, 816 a memory page has been allocated to the subject process and, if the memory page is a stack of a susceptible program, the execute privileges for that page have been revoked.

Those skilled in the art will appreciate that when a memory page is allocated 806 the execute privileges bit for the page is set by default. Accordingly, only those memory pages which are allocated by a susceptible process to a stack configuration are denied execute privileges.

The instant invention has many distinct advantages over the prior art memory allocation system and buffer overflow attack detection and handling systems. These advantages will be readily apparent to those skilled in the art, but include the fact that the instant process does not drain system resources by making evaluations of every process running on a system. Rather, only the processes which are susceptible to buffer overflow attacks are maintained under the instant process. Additionally, the instant method and system does not require execute privileges to be denied for those applications that take advantage of the ability to execute small portions of code on the stack. Also, the instant system and method protects against buffer overflow attacks in a more secure way, as it does not depend upon a canary test value within the stack to determine if the stack has been overwritten. Rather, all execution on the stack for at-risk processes is revoked.

As to the manner of operation and use of the present invention, the same is made apparent from the foregoing discussion. With respect to the above-description, it is to be realized that although embodiments of specific operating systems, memory structures, hardware, representations, databases, and languages may be disclosed, those enabling embodiments are merely illustrative and the optimum relationships for the parts of the invention are to include variations in composition, form, protocol, function, and manner of operation, which are deemed readily apparent to one skilled in the art in view of this disclosure. All relevant relationships to those illustrated in the drawings and this specification are intended to be encompassed by the present invention.

Therefore, as the foregoing is considered as illustrative of the principles of the invention, numerous modifications will readily occur to those skilled in the art. It is not desired to limit the invention to the exact construction and operation shown or described. All suitable modifications and equivalents may be resorted to, falling within the scope of the invention.

What is claimed is:

1. A method for handling buffer overflow attacks against an application program running on a data processing system, having a CPU and a RAM divided into pages, the method comprising the steps of:
    designating an execution flag for each page of RAM allocated to a stack of the application program;
    permitting CPU execution of data on pages of RAM according to the execution flag;
    determining whether the application program is susceptible to buffer overflow attacks; and
    if the application program is susceptible to buffer overflow attacks, setting the execution flag as to the pages of RAM allocated to the stack of the application program to prohibit execution.

2. The method of claim 1 wherein step of permitting CPU execution comprises the steps of:
    examining the execution flag on the page of RAM;
    if the execution flag is not set, triggering a hardware interrupt; and
    otherwise executing the data on the page.

3. The method of claim 1 further comprising the steps of:
    establishing a process structure table;
    maintaining the process structure table by annotating within the process structure table the susceptibility of the application program to buffer overflow attacks,
    wherein the step of determining susceptibility to buffer overflow attacks is made with reference to the process structure table.

4. The method of claim 2 further comprising the steps of:
    establishing a process structure table;
    maintaining the process structure table by annotating within the process structure table the susceptibility of the application program to buffer overflow attacks,
    wherein the step of determining susceptibility to buffer overflow attacks is made with reference to the process structure table.

5. The method according to claim 3 wherein the step of maintaining the process structure table is done once at the beginning of execution of the application program, and
    the step of determining susceptibility is performed upon each receipt of a request to allocate an additional page of RAM for the application program code.

6. The method according to claim 4 wherein the step of maintaining the process structure table is done once at the beginning of execution of the application program, and
    the step of determining susceptibility is performed upon each receipt of a request to allocate an additional page of RAM for the application program code.

7. The method according to claim 5 wherein request to allocate an additional page of RAM is a request to allocate the additional page of RAM for the stack.

8. The method according to claim 6 wherein request to allocate an additional page of RAM is a request to allocate the additional page of RAM for the stack.

* * * * *